(12) United States Patent  
Wilson

(10) Patent No.: US 7,620,173 B1  
(45) Date of Patent: Nov. 17, 2009

(54) HEADSET WITH INTEGRATED BOOM CLIP

(75) Inventor: Jay Wilson, Portola Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 389 days.

(21) Appl. No.: 11/728,551

(22) Filed: Mar. 26, 2007

(51) Int. Cl.
*H04M 1/00* (2006.01)
*H04M 9/00* (2006.01)
*H04R 25/00* (2006.01)

(52) U.S. Cl. .................. 379/430; 381/370; 455/575.2

(58) Field of Classification Search ............ 379/430; 381/370, 374–376, 379, 330, 381, 383; 455/575.1, 455/575.2
See application file for complete search history.

(56) References Cited

U.S. PATENT DOCUMENTS 6,804,364 B1 * 10/2004 De Jonge .................. 381/381
2004/0052363 A1 * 3/2004 Bodley et al. ............. 379/430
2005/0124391 A1 * 6/2005 Lee et al. ................ 455/575.1

* cited by examiner

*Primary Examiner*—Tuan D Nguyen
(74) *Attorney, Agent, or Firm*—Patent Law Professionals

(57) ABSTRACT

A headset having an integrated boom clip for attaching the headset to an object. The headset includes a bottom enclosure, a hinge system coupled to the bottom enclosure, and a boom coupled to the hinge system. The bottom enclosure, boom and hinge system are configured so that the boom can be selectively positioned relative to the bottom enclosure in a closed position or in an open position. In the closed position the boom can be used to clip the headset to an object such as, for example, the user's clothing.

12 Claims, 4 Drawing Sheets

HEADSET WITH INTEGRATED BOOM CLIP

FIELD OF THE INVENTION

The present invention relates generally to the field of headsets, including those used for telephone communications. More specifically, the present invention relates to a headset having an integrated boom clip, which can be used to clip the headset to an object, such as, for example, a user's clothing.

BACKGROUND OF THE INVENTION

Headsets of various types are commonly used for telephone or radio communications. With reference to FIG. 1 a conventional wireless headset 10 is shown, including a bottom enclosure 12 on which is mounted an ear hook 14, an ear tip 16 and a call control switch 18. A boom 20 is connected to bottom enclosure 12, and a microphone, not shown, is located in the end of the boom 20. In operation, the user hooks the ear hook 14 over the ear and inserts the ear tip 16 into the ear. The boom 20 is positioned so that the microphone is near the user's mouth. The call control switch 18 is used to activate the device when a call is received or the user wishes to place a call.

The design shown in FIG. 1 is wireless, but it should be understood that headphones can also be connected by wires to a telephone system.

In some cases a user may wish to wear the headset over the ear even when the headset is not activated and the user is not engaged in a telephone call. However, often the user would prefer not to have the headset attached to the ear. But in such a case the user may not have a place to easily and conveniently store the headset. This is especially true of wireless headsets that the user may wish to use while moving around.

Accordingly, it is desirable to have a headset that the user can easily and conveniently store when it is not activated.

BRIEF SUMMARY OF THE INVENTION

A headset having an integrated clip for attaching the headset to an object (e.g., to a user's clothing) is disclosed. An exemplary headset includes a bottom enclosure, which includes many of the electronic components of the headset such as a wireless transmitter and receiver for sending and receiving RF signals and a transducer to receive the RF signals and convert them to audible sound waves, a boom, and a hinge system that connects the boom to the bottom enclosure. The hinge system is configured to provide a user the ability to swing the boom of the headset from a closed position to an open position. The user can locate the boom in the closed position with the headset hooked to the user's clothing or other object, such as a backpack. The object is gripped between a section of the boom and an opposing section of the bottom enclosure.

Further features and advantages of the present invention, as well as the structure and operation of the above-summarized and other exemplary embodiments of the invention, are described in detail below with respect to accompanying drawings, in which like reference numbers are used to indicate identical or functionally similar elements.

DETAILED DESCRIPTION

Figure 1:
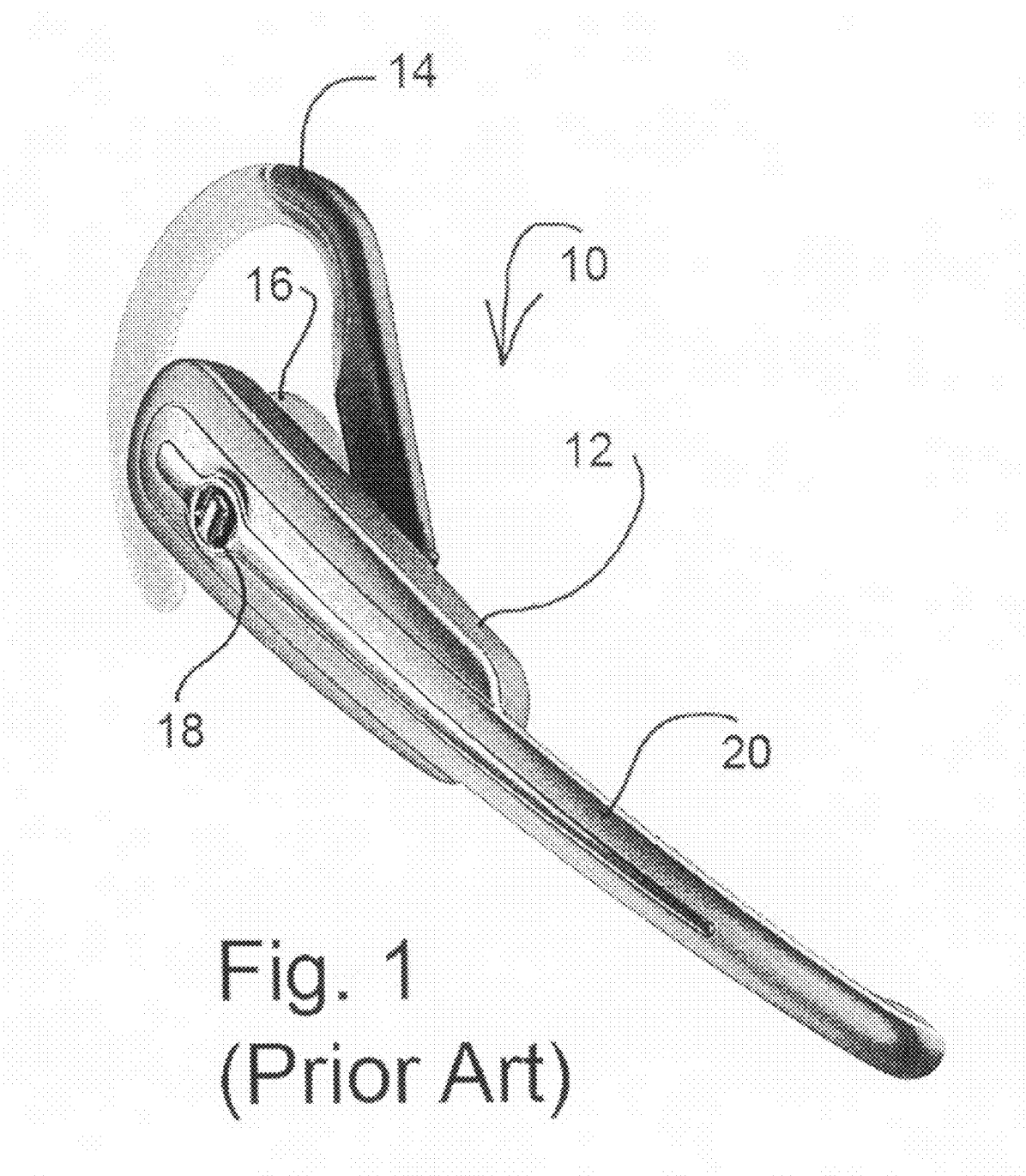
FIG. 1 is an isometric view of a conventional headset.

Embodiments of the present invention are described herein. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

With reference to FIGS. 2-5, an embodiment of the present invention is shown. The headset 30 includes a bottom enclosure 32 that includes many of the electronic components of the headset, such as a wireless transmitter and receiver for sending and receiving RF signals and a transducer to receive the RF signals and convert them to audible sound waves. An ear tip 34 and ear hook 36 are connected to the bottom enclosure. A user inserts the ear tip 34 into the ear and hooks the ear hook 36 over the ear when the headset is in use. The bottom enclosure 32 has a first side 40 and a second side 42 and a first end 41 and a second end 43. The ear tip 34 and the ear hook 36 are both connected to the second side 42 of the bottom enclosure 32, and a call control switch 44 is connected to the first side 40 of the bottom enclosure 32. The call control switch 44 is used to activate the headset when a call is received or the user wishes to place a call. The user can also press the call control switch 44 to terminate a call.

A first end 50 of boom 52 is connected to the first end 41 of the bottom enclosure 32, and near the second end 54 of boom 52 a microphone 60 is mounted. The first end 50 of the boom 52 is connected to the first end 41 of the bottom enclosure 32 by a hinge system 62. The boom 52 includes a port 64 substantially the same shape and size as the call control switch 44, and the boom 52 has a first side 70 and a second side 72.

Figure 2:
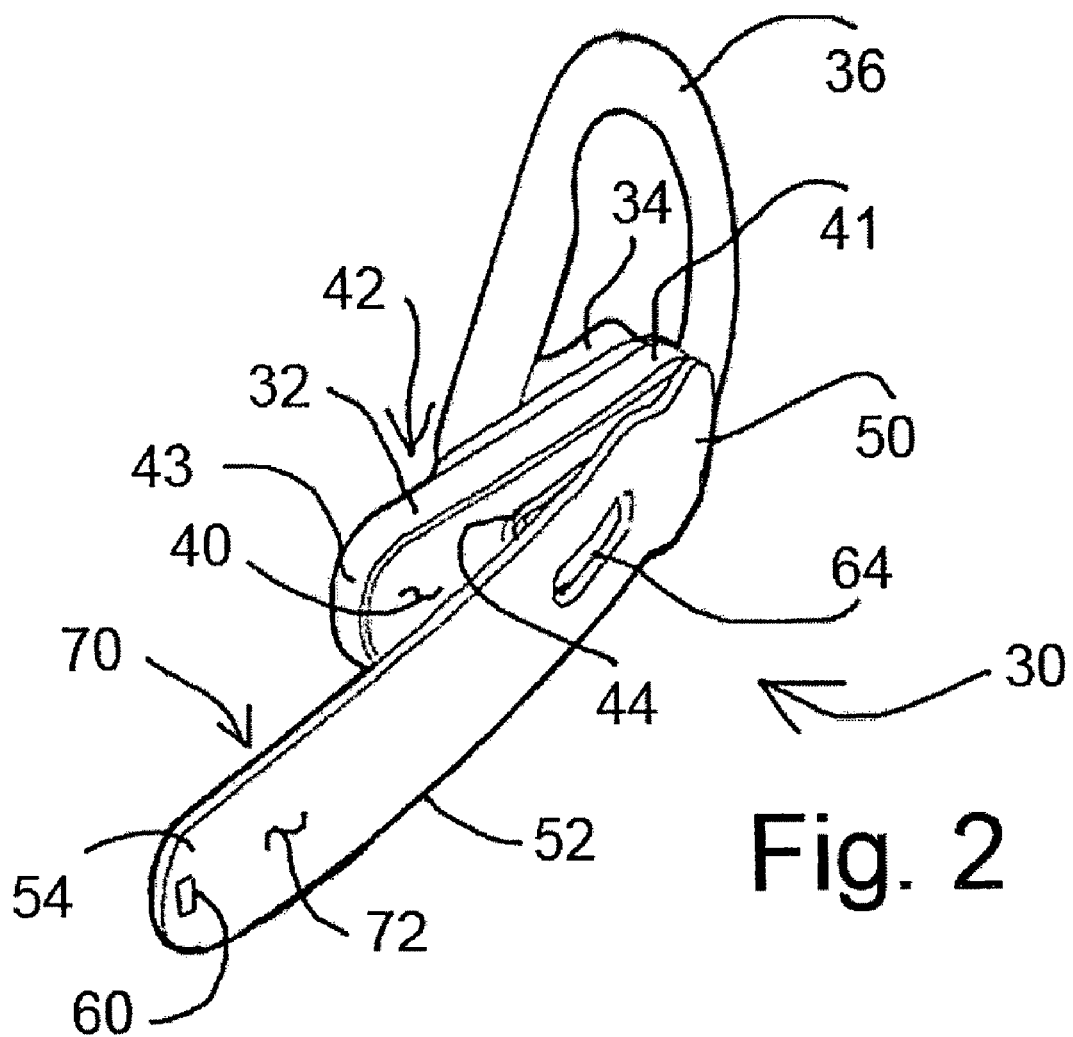
FIG. 2 is an isometric view of a headset having an integrated clothing clip, where the clothing clip is configured in an open position, according to an embodiment of the present invention.
Figure 3:
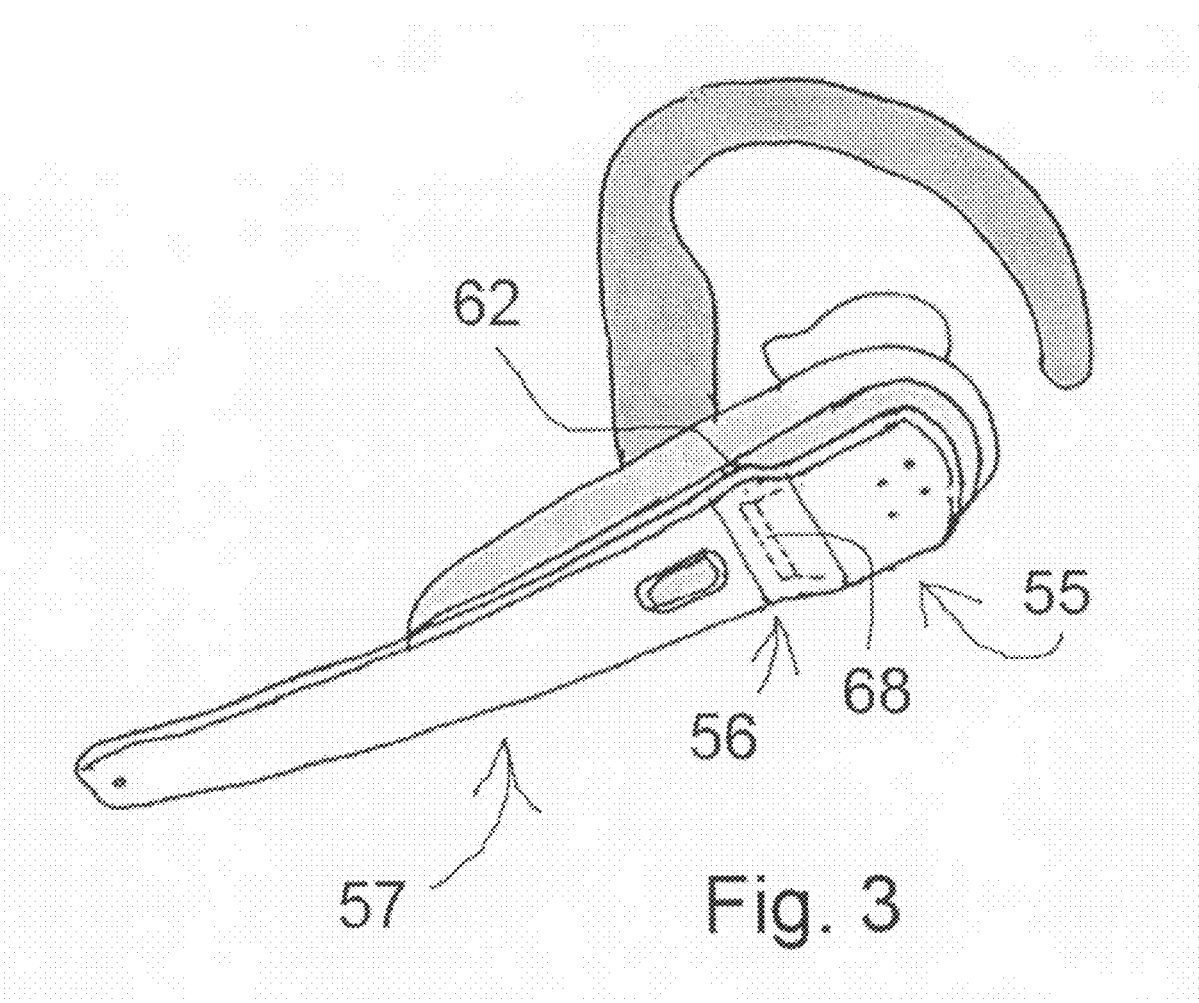
FIG. 3 is an isometric view of a headset having an integrated clothing clip, where the clothing clip is configured in a closed position, according to an embodiment of the present invention.
Figure 4:
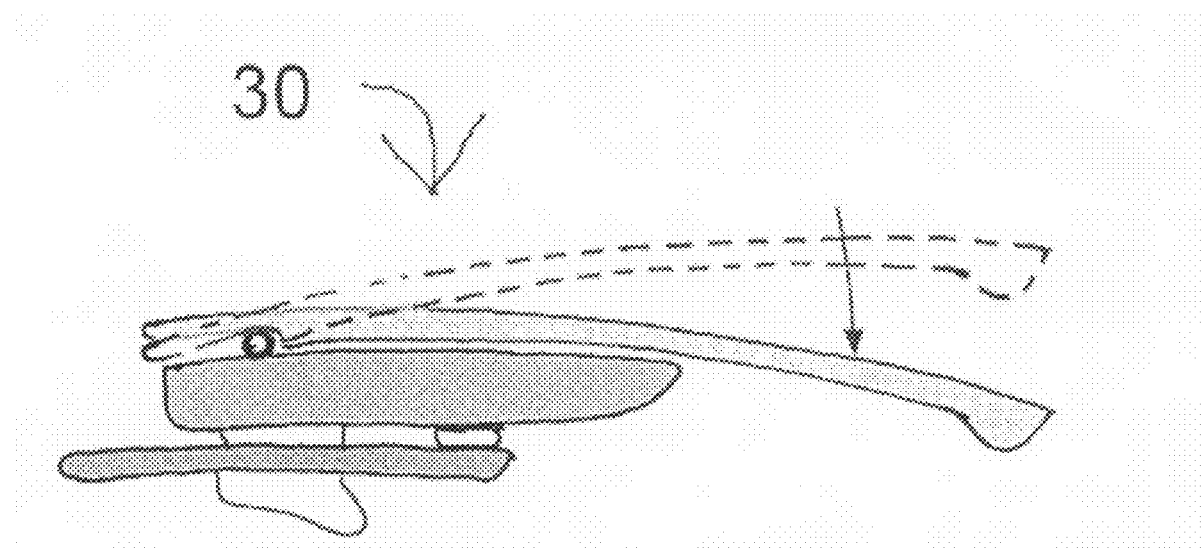
FIG. 4 is a side view of a headset having an integrated clothing clip, which illustrates operation of the clip, according to an embodiment of the present invention.

The hinge system 62 includes a spring system 68 which biases to boom 52 toward a closed position. The hinge system 62 operates to permit the user to swing the boom from a closed position (FIG. 3) wherein the first side 70 of the boom 52 is adjacent to the first side 40 of the bottom enclosure 52 to an open position (FIG. 2). The boom swings about 10 degrees between the open and closed positions.

The boom 52 includes three sections, a first section 55 which extends from the first end 50 to a hinge section 56, and a third section 57 which extends from the hinge section 56 to the second end 54. When the boom 52 is in the closed position (FIG. 3) the first section 55 is spaced apart from the bottom enclosure 32, and the second section 57 is adjacent the bottom enclosure 32. The first side 70 of the third section 57 has a configuration which is substantially the same as the configuration of the first side 40 of the bottom enclosure 32 in order to provide a substantial engagement surface for engaging the user's clothing. More specifically, when viewed from the side (FIG. 4) the first side 70 of the third section 57 and the first side 40 of the bottom enclosure 32 are generally semi-circular in configuration. The hinge section 56 has an arcuate configuration when viewed from the side in order to connect the first section 55 and the third section 57.

Figure 5:
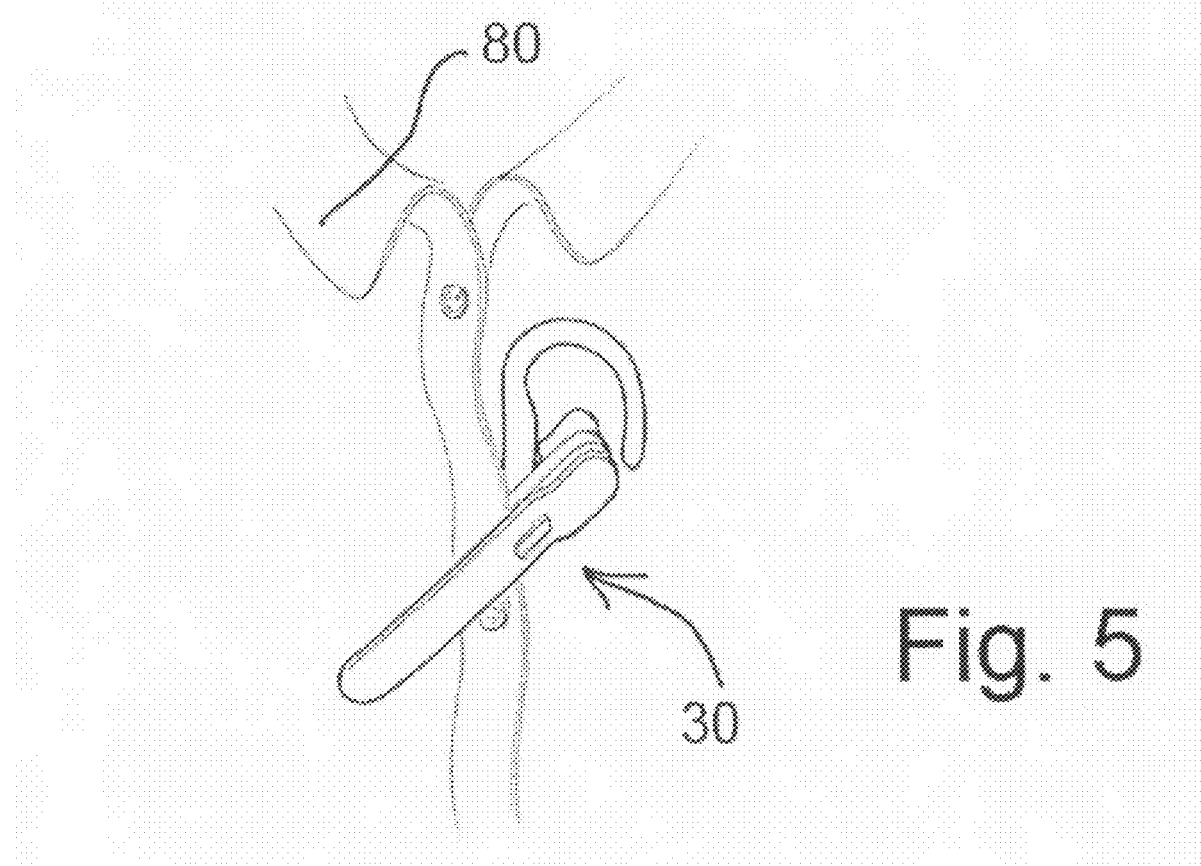
FIG. 5 is a drawing illustrating how a headset having an integrated clothing clip be attached to a user's clothing, in accordance with embodiments of the present invention.

In operation, the user can locate the boom 52 in the closed position as shown in FIG. 5 with the headset 30 hooked to the user's clothing such as a shirt 80. The clothing is gripped between a section of the boom 52 and an opposing section of the bottom enclosure 32, and the spring 68 operates to hold the boom 52 in closed relation to the bottom enclosure 32 to grip the user's clothing.

It should be understood that the call control switch 44 protrudes through port 64 so that when the user receives a call the user can push the call control switch 44 to activate the headset 30. At this time the user can release the holding action of the spring 68 by applying force to the first section 55 of the boom 50 to open the boom 52 to the open position.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. Accordingly, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A headset, comprising: a bottom enclosure including electrical components, said bottom enclosure having a first side and a second side; a hinge system coupled to said bottom enclosure; and a boom including a first section, a hinge section coupled to said hinge system, and a third section having a first side and a second side, the first side of said third section having a configuration that is substantially the same as a configuration of the first side of said bottom enclosure, wherein said boom is configured so that it can be selectively positioned relative to said bottom enclosure in a closed position when the first side of said boom is located adjacent the first side of said bottom enclosure or in an open position.

2. The headset according to claim 1 wherein said hinge system comprises a spring configured to bias said boom toward said bottom enclosure.

3. The headset according to claim 1 wherein said hinge section and said first section are constructed and arranged so that said third section is spaced apart from said bottom enclosure when said boom is in the closed position.

4. The headset according to claim 1 wherein said first side of said boom has a configuration that corresponds to the configuration of said bottom enclosure when said boom is in the closed position.

5. A headset which is attachable to an object, the headset comprising: a bottom enclosure including electrical components, said bottom enclosure having a first side and a second side; and a boom coupled to said bottom enclosure, said boom including a first section, a hinge section coupled to said bottom enclosure so that said boom can be selectively positioned relative to said bottom enclosure with said object gripped between the boom and the bottom enclosure, and a third section having a configuration that is substantially the same as a configuration of the first side of said bottom enclosure.

6. The headset according to claim 5, further comprising:
a hinge system coupling said boom to said bottom enclosure;
an ear tip coupled to said bottom enclosure; and
a microphone coupled to said boom.

7. The headset according to claim 5, further comprising a spring system configured to bias said boom to grip said object between the boom and the bottom enclosure.

8. The headset according to claim 5 wherein said hinge section and said first section are constructed and arranged so that said third section is spaced apart from said bottom enclosure when said boom is in a closed position.

9. A headset with an integrated clip, comprising: a transceiver housing having a first side and a second side; and a microphone boom coupled to said transceiver housing, said microphone boom including a first section, a hinge section and a third section, wherein said transceiver housing and said microphone boom comprise arms of a clip for gripping an object, and wherein a first side of the third section of said microphone boom has a configuration that is substantially the same as a configuration of the first side of said transceiver housing.

10. The headset of claim 9, further comprising a hinge system coupling said microphone boom to said transceiver housing, said hinge system configured to allow said clip to be configured in a closed position in which said clip grips an object and an open position in which said clip does not grip an object.

11. The headset of claim 10 wherein said hinge system comprises a spring system configured to bias said microphone boom toward said transceiver housing.

12. The headset of claim 9 wherein said headset further comprises an ear hook coupled to said transceiver housing, said ear hook not comprising part of the clip for gripping an object.

* * * * *